Nov. 25, 1952     H. E. BEGLE     2,619,009
CHIP DISPERSAL DEVICE
Filed April 9, 1952
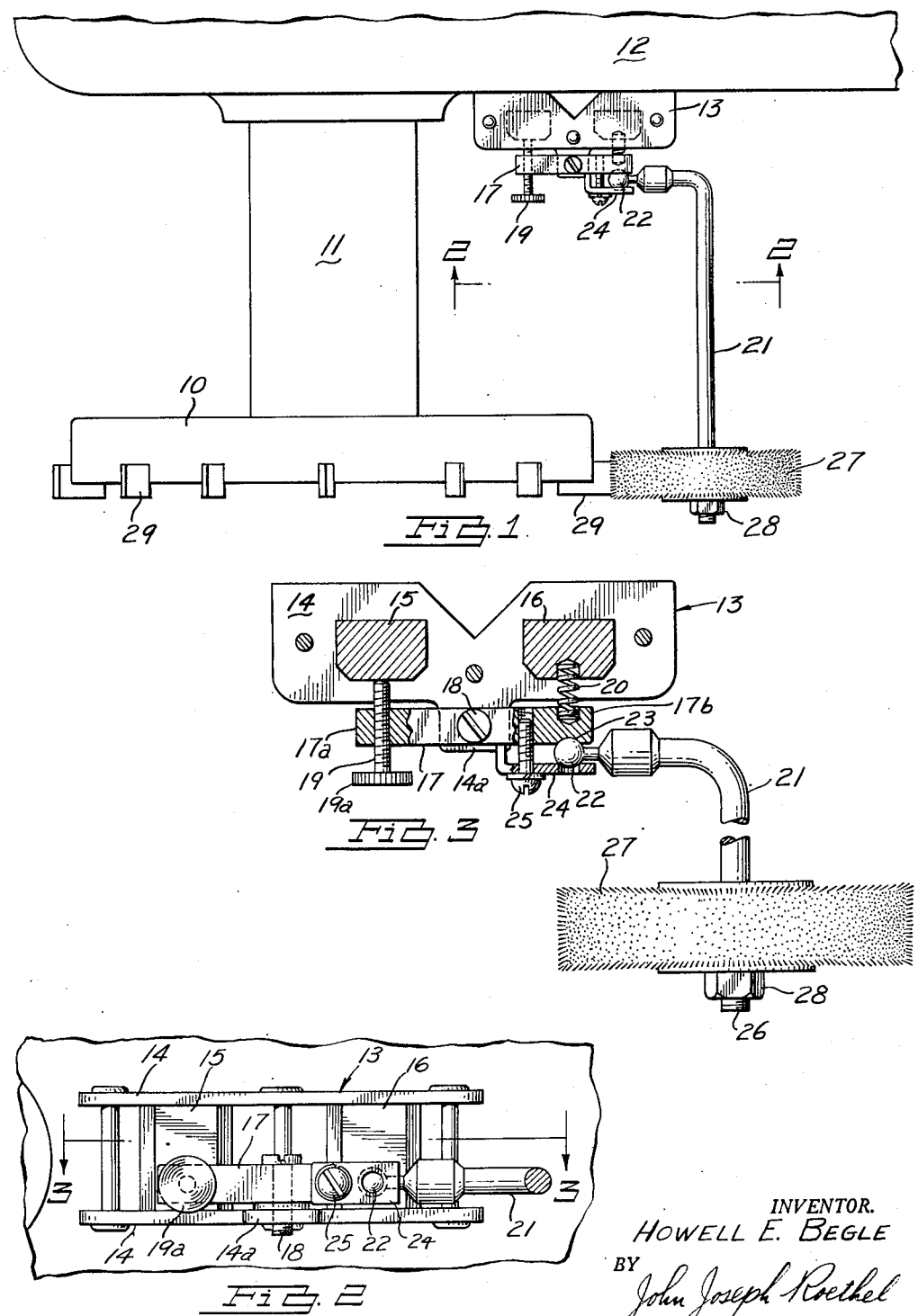
INVENTOR.
HOWELL E. BEGLE
BY John Joseph Roethel
ATTORNEY Patented Nov. 25, 1952

2,619,009

UNITED STATES PATENT OFFICE 2,619,009

CHIP DISPERSAL DEVICE

Howell E. Begle, Commerce, Mich.

Application April 9, 1952, Serial No. 281,427

2 Claims. (Cl. 90—11)

This invention relates to a chip dispersal device and more specifically to a milling machine accessory particularly suited for brushing adhering chips from the cutter blades of a milling cutter.

When a piece of metal is subjected to a milling operation there are always metal particles or chips of varying sizes which adhere to the cutter blades of the milling cutter. Because of the heat generated when the metal particles are sheared from the work surface, followed by the relatively rapid cooling of the particles, the particles become relatively hard and brittle. These particles or chips, if not removed from the cutter blades, interfere with the cutting action of the blades as they again make contact with the work and cause the cutting edges to become dull at an accelerated rate.

It is an object of the present invention to provide an improved chip dispersal device which is readily attachable to a surface of the column or spindle head of a milling machine and which includes adjusting means whereby the operative member or brush means forming a part of the device may be accurately positioned in the desired relationship to the surfaces of the milling cutter blades from which the chips are to be dispersed. The improved chip dispersal means provides a compact, efficient and effective means for removing chips which ordinarily are not carried away by the coolant stream and which resist being blown away by a directed stream.

In its illustrated embodiment the invention comprises a brush means carried on one end of a rod-like member, the rod-like member at its other end being attached to a mounting member, the construction and arrangement of the coacting portions of the rod-like member and mounting member permitting the former to be universably adjustable relative to the latter, and the mounting member in turn being adjustably mounted on a base structure which carries magnetic means adapted to magnetically hold the base structure to the milling machine column or spindle head.

An important additional feature of the present invention is the provision of a resilient means between the mounting member and the base structure. Because of the spaced arrangement of the cutter blades of a conventional milling cutter, the engagement of the chip dispersal brush element with the cutter blades will be of an intermittent nature. The resilient means permits the brush mounting members and therefore the brush to move laterally as the brush is engaged by each cutter blade. As each blade moves out of engagement with the brush the resilient means in effect throws the brush against the next blade.

The compound relative rotational and lateral movement between the milling cutter and the brush means provides an effective and efficient sweeping action for removing chips adhering to the cutter blades.

Other features and objects will appear in the following description and appended claims, reference being had to the accompanying drawings forming a part of this specification wherein like reference characters designate corresponding parts in the several views.

Fig. 1 is a diagrammatic view of a fragmentary portion of a vertical spindle milling machine with the chip dispersal device embodying the present invention mounted thereon in operative relation to the milling cutter.

Fig. 2 is an enlarged view taken substantially through line 2—2 of Fig. 1 looking in the direction of the arrows.

Fig. 3 is an enlarged section taken substantially through line 3—3 of Fig. 2 looking in the direction of the arrows.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

The illustrated embodiment of the present invention is shown in operative relation to a milling cutter 10 mounted on the vertical spindle 11 of a vertical spindle milling machine of which a fragmentary portion 12 of the spindle head is shown. It will be understood, however, that the invention is not limited to use with the type of milling machine herein employed by way of example.

The chip dispersal device embodied in the present invention comprises a fabricated base structure 13 carrying between the side walls 14 thereof a pair of permanent magnets 15 and 16. The magnets 15 and 16 are of sufficient strength to hold the chip dispersal device base structure firmly to the milling machine surface. A mounting or pivot member or bar 17 is pivoted intermediate its ends on a suitable pivot stud 18 to an extension 14a of one of the base structure walls. As best seen in Fig. 3, the bar 17 is of sufficient length to extend over both of the magnets 15 and 16.

The bar 17 has at one end 17a thereof a threaded hole adapted to receive an adjusting screw 19 having a knurled head 19a on one end. The other end of the adjusting screw 19 is adapted to bear against the near surface of the magnet 15. A spring 20 is interposed between the other end 17b of the bar 17 and the magnet 16, both of which are provided with recesses adapted to receive the respective ends of the spring 20 to prevent displacement of the spring. The spring 20 in addition to maintaining the adjusting screw 19 in contact with the surface of the magnet 15 has another important function to be explained.

An angular rod 21 formed with a spherical portion 22 is adjustably associated with the end 17b of the mounting or pivot bar 17. The spherical portion 22 is held between a concave recess 23 in the surface of the bar 17 and a clamp member 24 held by a clamp screw 25. This construction and arrangement provides a ball and socket structure permitting substantially universal adjustability of the rod 21 to the mounting or pivot bar 17. The rod 21 is shown having a right angle bend near the end mounted on the mounting or pivot bar 17. It will be apparent that the rod 21 may be of other shapes depending on the conditions to be met when the device is to be used on various types of machines. Suitably journalled on the end 26 of the rod 21 is a wire wheel brush 27 preferably made of bronze wire but not limited to such material. As illustrated, the brush 27 is removably held on the end 26 of the rod 21 by a nut 28 to permit ready replacement when worn.

Fig. 1 illustrates one manner in which the chip dispersal device embodied in the present invention is adapted to be used. The base structure 13 is first positioned on the spindle head surface and is magnetically clamped thereon. The rod 21 is then adjusted as desired to place the brush 27 in approximate operative relationship, in this case, to the peripheral surfaces of the cutter blades 29. If necessary, final adjustment of the brush position may be made by manipulation of the adjusting screw 19. The peripheral surface of the brush preferably will lie inside the path of the outer or peripheral surfaces of the cutter blades 29.

In operation, as each cutter blade 29 contacts the brush 27 any chips adhering to the peripheral surface of the blade will be dislodged. The impact of each cutter blade 29 on the brush 27 tends to move the brush and the rod 21 on which it is mounted laterally. The lateral movement is permitted by the relationship between the pivoted bar 17 and the spring 20, the spring being placed under compression as the end 17b of the bar is pivoted toward the magnet 16. As the particular cutter blade in contact with the brush 27 moves out of such relation, the spring 20 causes pivotal movement of the bar end 17b away from the magnet 16 and in effect causes the brush 27 to be thrown in the path of the next cutter blade.

The combined or compound relative rotational and lateral movement between the milling cutter and the brush means provides an effective and efficient sweeping action for removing the chips adhering to the cutter blades.

I claim:

1. In a chip dispersal device adapted to remove chips from the cutter blades of a milling cutter, a base structure, magnetic means adapted to hold said base structure on a milling machine, a mounting bar pivotally mounted on said base structure, means for pivotally adjusting said mounting bar relative to said base structure, a rod member, ball and socket means mounting said rod member at one end thereof on said mounting bar, brush means carried on the other end of said rod member, the construction and arrangement of said mounting bar and mounting means permitting adjustment of said brush means relative to the milling cutter blades after attachment of the base structure to the milling machine, and resilient means interposed between said mounting bar and said base structure permitting lateral movement of the brush means as the cutter blades move into and out of engagement therewith.

2. In a chip dispersal device adapted to remove chips from the cutter blades of a milling cutter, a base structure, magnetic means adapted to hold said base structure on a milling machine, a mounting bar pivotally mounted on said base structure, means for pivotally adjusting said mounting bar relative to said base structure, a rod member, ball and socket means mounting said rod member at one end thereof on said mounting bar, brush means, means rotatably mounting said brush means on the other end of said rod member, the construction and arrangement of said mounting bar and mounting means permitting adjustment of said brush means relative to the milling cutter blades after attachment of the base structure to the milling machine, and resilient means interposed between said mounting bar and said base structure permitting lateral movement of the brush means as the cutter blades move into and out of engagement therewith.

HOWELL E. BEGLE.

REFERENCES CITED

The following references are of record in the file of this patent:

UNITED STATES PATENTS

| Number | Name | Date |
| --- | --- | --- |
| 417,093 | Robison | Dec. 10, 1889 |
| 662,749 | Arthur | Nov. 27, 1900 |
| 1,115,348 | Taylor | Oct. 27, 1914 |
| 1,744,006 | Laws | Jan. 14, 1930 |
| 1,778,053 | White | Oct. 14, 1930 |
| 2,113,931 | Biro | Apr. 12, 1938 |